United States Patent [19]
Han

[11] Patent Number: 5,621,262
[45] Date of Patent: Apr. 15, 1997

[54] CARBON BRUSH HOLDER

[76] Inventor: Soon Y. Han, #524-805 Jukong Apartment, 27, Chamshil-Dong, Songpa-Gu, Seoul, Rep. of Korea

[21] Appl. No.: 640,157

[22] Filed: Apr. 30, 1996

[30] Foreign Application Priority Data

May 2, 1995 [KR] Rep. of Korea .................. 95-9266 U

[51] Int. Cl.$^6$ ................................................ H02K 13/00
[52] U.S. Cl. .......................... 310/239; 310/242; 310/245; 310/248; 310/249
[58] Field of Search .................................. 310/239, 242, 310/248, 249, 245, 247

[56] References Cited

U.S. PATENT DOCUMENTS

| 4,095,131 | 6/1978 | Febonio | 310/239 |
|---|---|---|---|
| 4,250,613 | 2/1981 | Sauerwein et al. | 29/597 |
| 4,375,040 | 2/1983 | Sauerwein | 310/239 |
| 4,551,646 | 11/1985 | Brown | 310/242 |
| 5,315,199 | 5/1994 | McCracken et al. | 310/239 |
| 5,481,150 | 1/1996 | Tanaka et al. | 310/249 |

FOREIGN PATENT DOCUMENTS

| 892545 | 9/1980 | U.S.S.R. | 310/239 |
|---|---|---|---|
| 617387 | 1/1944 | United Kingdom . | |

*Primary Examiner*—Steven L. Stephan
*Assistant Examiner*—Tran N. Nguyen
*Attorney, Agent, or Firm*—Ladas & Parry

[57] ABSTRACT

A carbon brush holder for a commutator motor which a carbon brush is replaceably installed in and which can facilitate assembling of the carbon brush holder and the carbon brush, and easily dissipate heat produced from the carbon brush, enhancing the function of the carbon brush. The carbon brush holder for a commutator motor used for as a housing of a carbon brush connected to a brush terminal via a flexible copper conductor reduces frictional contacts of side surfaces of the carbon brush and inside surfaces of the brush holder body which has no cartridge-formed conductive insert, and prohibits electric short phenomena therebetween. Thus, the generation of heat is reduced.

8 Claims, 7 Drawing Sheets

CARBON BRUSH HOLDER

BACKGROUND OF THE INVENTION

1. Field of the Invention

The present invention relates to a small-sized commutator motor and in particular to a carbon brush holder for an electric power tool wherein a carbon brush is replaceably installed and no conductive insert is present at the peripheral portion of a slot for receiving the carbon brush, so that assembling of the carbon brush holder and the carbon brush is facilitated and heat produced from the carbon brush is easily dissipated, thereby enhancing the function of the carbon brush.

2. Description of the Prior Art

In general, a small-sized commutator motor comprises a rotary part having an armature and a commutator, and a stationary part having a field coil, a field iron core and a brush, wherein both of the rotary part and the stationary are mounted within a motor housing and, wherein the brush is formed from a carbon material having good commutating characteristics and excellent durability.

The carbon brush conducts electric current while being in contact with the surface of the commutator revolving at a high velocity, and thus the surface wears out and heat is produced due to the frictional contact with the revolving commutator and sparks generated by electric current. In this connection, a spring is used as elastic forcing means to compensate for the wear of the contacting surface of the carbon brush.

Figure 1:
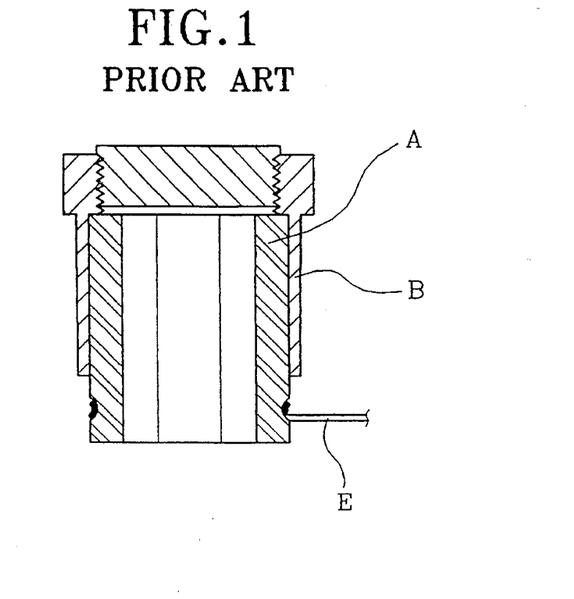
FIG. 1 is a longitudinal section view of a brush holder of the prior art.

As shown in FIG. 1, a carbon brush holder well-known in the art comprises an insert A formed from brass. The insert is molded by a plastic material B or assembled by inserting a cartridge-formed brass insert to a ready-molded plastic housing. However, this carbon brush holder has a disadvantage that since the insert serves as an electric conductor and the carbon brush inevitably undergoes frictional contact with the insert A, excessive heat is generated by electric short phenomena and thus the life span of the carbon brush is substantially reduced.

Figure 2:
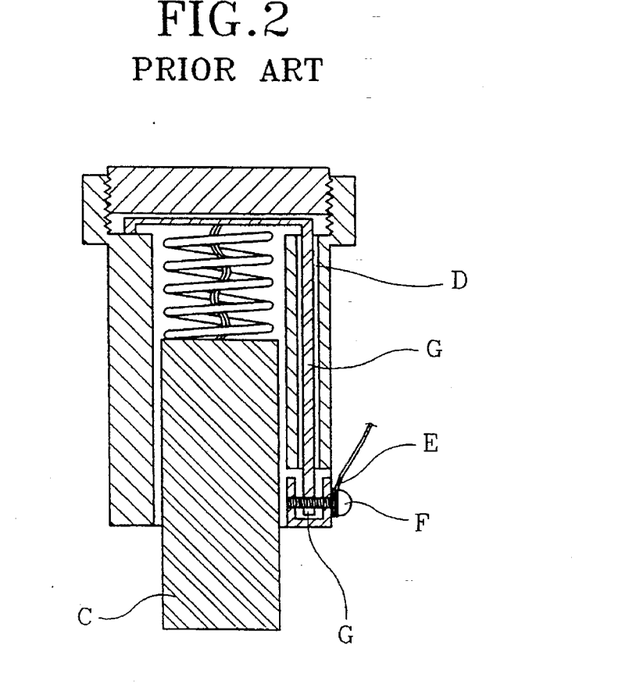
FIG. 2 is a longitudinal section view showing an another embodiment of the prior art.
Figure 3:
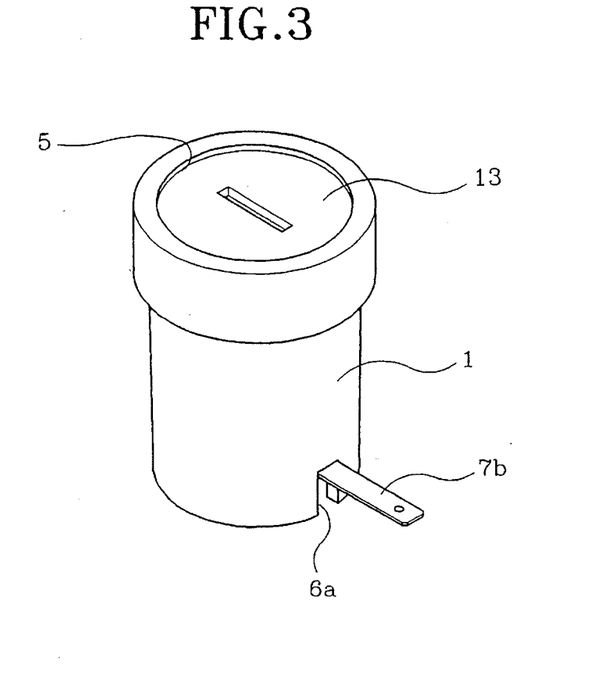
FIG. 3 is a perspective view showing a preferred embodiment of the present invention.
Figure 4:
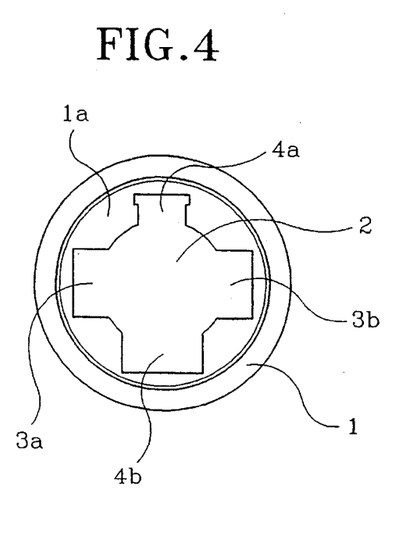
FIG. 4 is a top plan view of the above embodiment of the invention.
Figure 5:
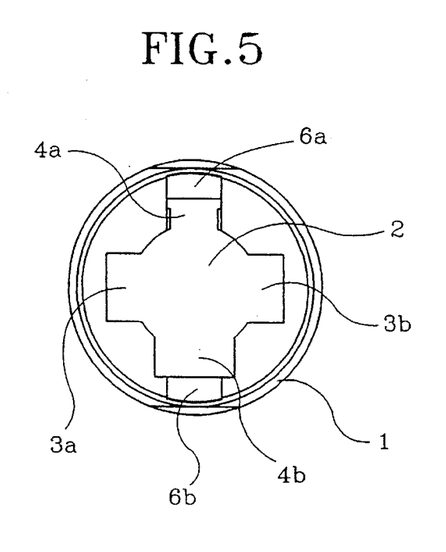
FIG. 5 is a bottom view of the above embodiment.
Figure 6:
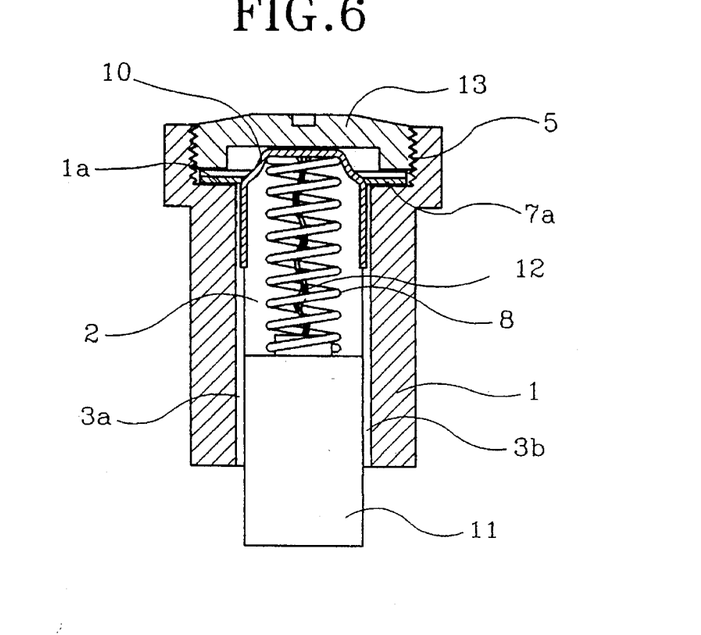
FIG. 6 is a side elevational section view of the above embodiment.
Figure 7:
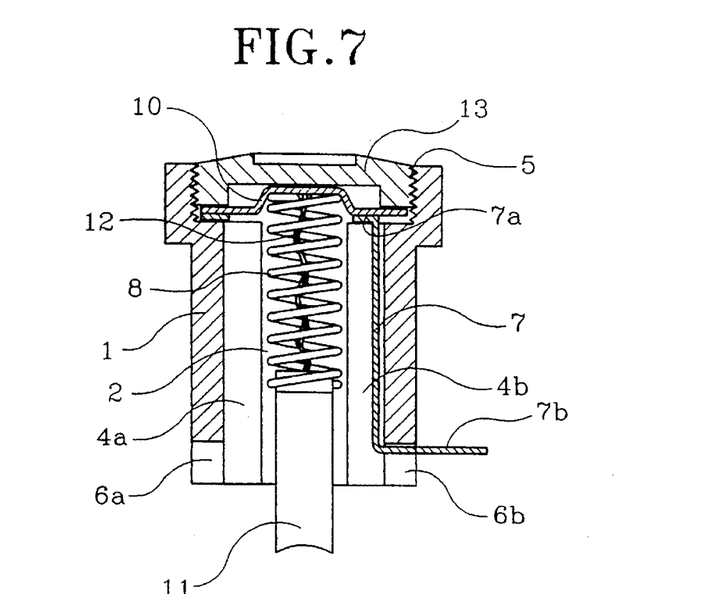
FIG. 7 is a front elevational section view showing an assembled state of the above embodiment.
Figure 8:
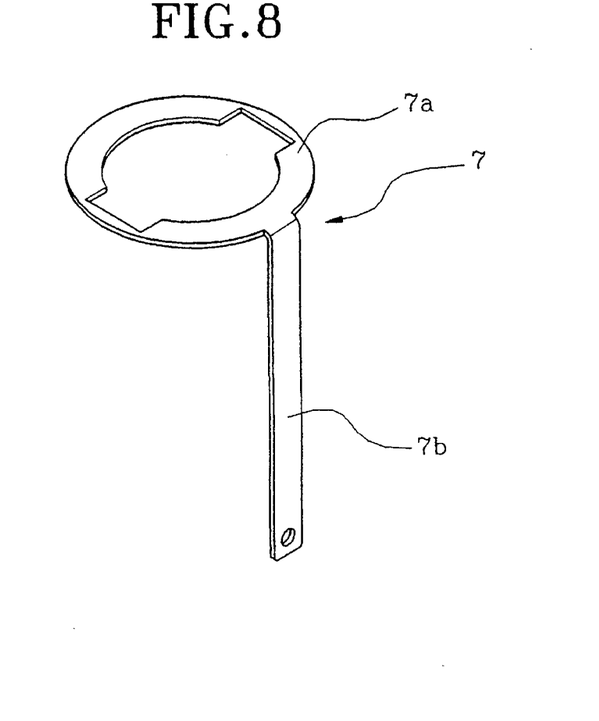
FIG. 8 is a perspective view of a lead terminal of an embodiment of the present invention.

Taking the above problem into consideration, a new construction as shown in FIG. 2 was developed, wherein the new construction comprises a through-hole D formed within the holder body to receive a lead terminal, the through-hole being extended between the top and bottom portions of the holder body, and a conductive wire E extended from a stator being connected to the lead terminal G using a screw F, thereby eliminating a nonferrous conductive insert as shown as "A" in FIG. 2. By such a new construction, it has become possible to prevent the short phenomena generated by electric current flowing on the side surfaces of the carbon brush, and productivity has been somewhat improved. However, the new construction has several problems in that the lead terminal receiving through-hole is difficult to form, it is difficult to smoothly connect the wire to the terminal when the through-hole is formed in a deformed shape, and it is inconvenient to assemble since the wire is connected by the screw.

SUMMARY OF THE INVENTION

The object of the present invention is to solve the above problems of the prior art. The carbon brush holder in accordance with the present invention having a carbon brush connected to a brush terminal via a flexible copper conductor and a lead terminal with a tab and a hanger portion is characterized in that it comprises a holder body formed from an insulation material, a receiving part formed to pass through the holder body in the longitudinal direction, having a head portion at its one end and directly receiving the carbon brush without a brass insert, a fitting portion having threads formed at the head portion, the diameter of the fitting portion being longer than that of the cross-shaped receiving part, a cap being inserted within the fitting portion, and a mounting step formed by the difference in diameters of the receiving part and the fitting portion; in that two opposed lead slots crossing to the brush slots and extended in the longitudinal direction of the receiving part are formed in the internal surface of the receiving part, the tab of the lead terminal being inserted into one lead slot with the hanger portion of the lead terminal being seated on the mounting step; in that two opposed brush slots extended in the longitudinal direction of the receiving part are also formed in the internal surface of the receiving part crossing to the lead slots, the carbon brush being inserted between the brush slots with the brush terminal of the carbon brush being seated on the mounting step; and in that a cooling opening is formed to be extended from one end portion to middle portion of each lead slot, the opening allowing the tab to be folded outwardly and releasing heat.

BRIEF DESCRIPTION OF THE DRAWINGS

The preferred embodiments of carbon brush holders in accordance with the present invention will be explained in detail with reference to the accompanying drawings, in which.

DETAILED DESCRIPTION OF THE PREFERRED EMBODIMENTS

The basic preferred embodiment of the present invention is shown in FIGS. 3 to 12.

The brush holder of the present invention comprises a holder body 1 formed with opposed brush slots 3a, 3b and opposed lead slots 4a, 4b in the internal surface of the cross-shaped receiving part 2, all of which are extended from the mounting step 1a to the lower end of the holder body 1 and brush slots and lead slots are alternately placed and spaced at a right angle along the circumferential direction of the internal surface. Each lead slot is provided with a cooling opening at the lower portion thereof. A lead terminal 7 having a hanger portion 7a at the top portion thereof and a tab 7b bent from the hanger portion to be extended downwardly is inserted into one of lead slots 4a, 4b with the hanger portion 7a being laid on the mounting step 1a, and brush terminal 10 is seated on the hanger portions 7a of the lead terminal 7. Thereafter, the lead terminal and the brush terminal are overlapped and pressed by a plastic cap 13 inserted into the fitting portion formed at the top of the receiving part 2, and the lower end of the tab 7b is bent through one of two cooling openings to be projected outside of the brush holder body.

Figure 9:
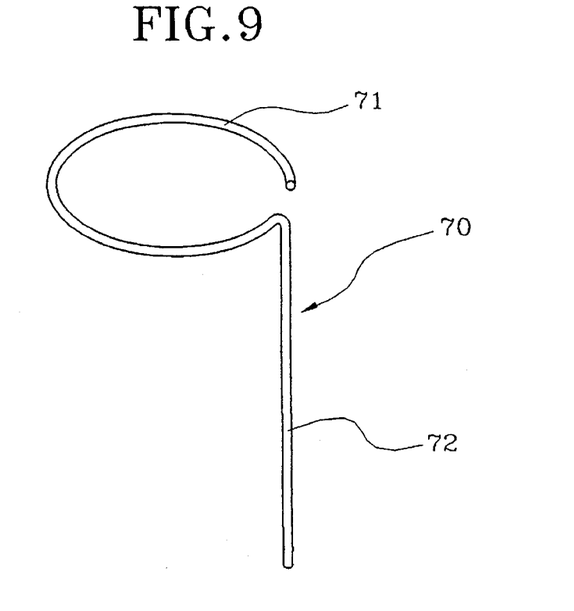
FIG. 9 is a perspective view showing another preferred embodiment of a lead terminal.
Figure 10:
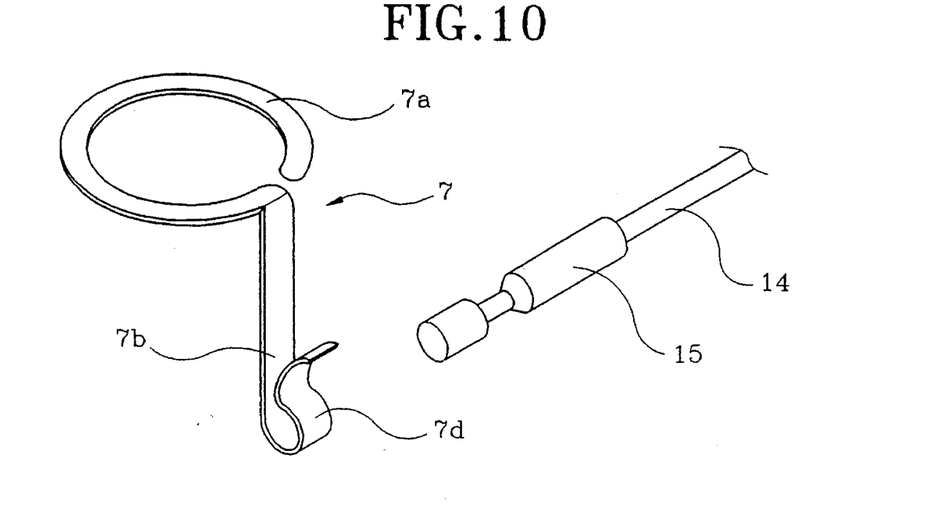
FIG. 10 is a perspective view showing another preferred embodiment of a lead terminal in disassembled state from a connection wire.

As shown in FIG. 9, the lead terminal may be formed from a rod-like material to have a hanger portion 71 at the top thereof and a terminal rod 72 folded downwardly from the hanger portion. Alternatively, the lower end of the lead terminal 7 may be folded into a shape to form a resilient holding portion 7d as shown in FIG. 10 and a connection rod 15 of an electric connection wire 14 may be inserted into the holding portion 7d to make an electric connection.

Figure 12:
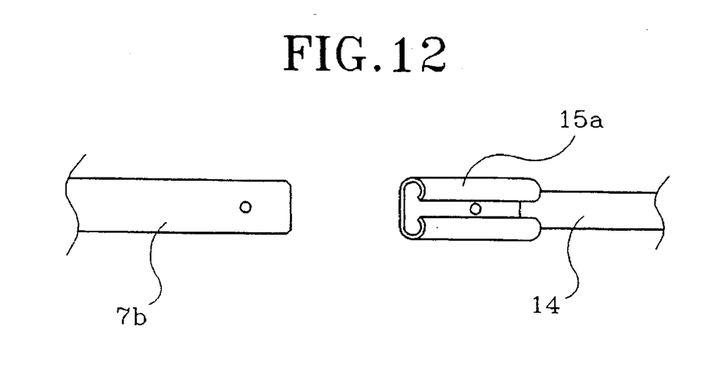
FIG. 12 is a partial perspective view showing another embodiment of FIG. 10 in a disassembled state.
Figure 13:
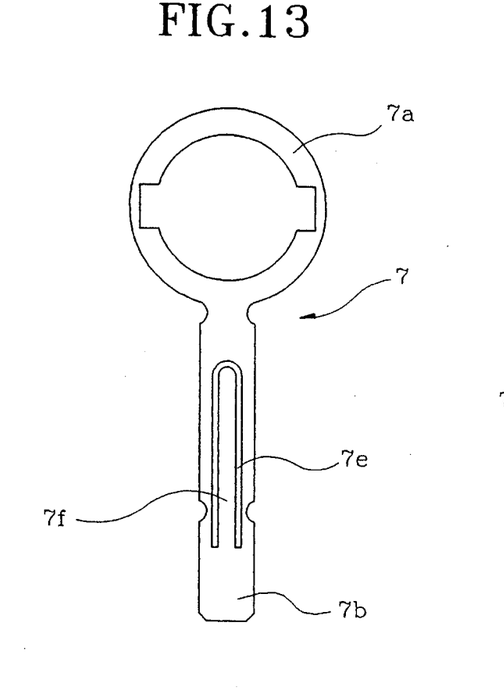
FIG. 13 shows another embodiment of FIG. 8 in an unbent state.
Figure 14:
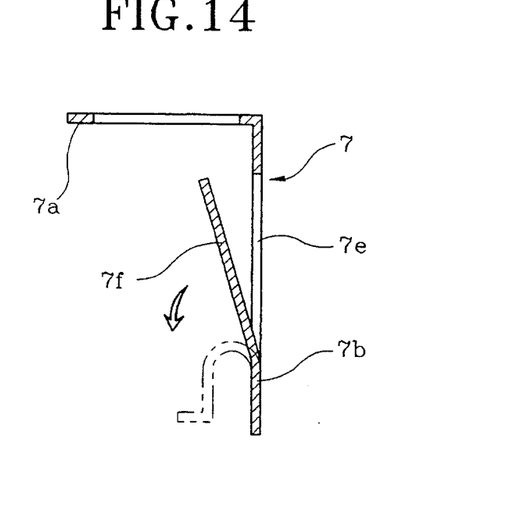
FIG. 14 is a section view showing the embodiment of FIG. 13 but in a bent state.

Furthermore, it is also possible to fit a receptacle 15a assembled to the end of the connection wire 14 to the tab 7b of the lead terminal 7 as shown in FIG. 12. Yet, as shown in FIGS. 13 and 14, it is also possible to form a slit 7e in the lead terminal 7b and then to form a stopper 7f by bending the portion surrounded by the slit 7e, whereby the lead terminal 7 can be firmly mounted within the holder body 1 and the projection of the carbon brush can be optionally restrained as explained herein below.

Figure 15:
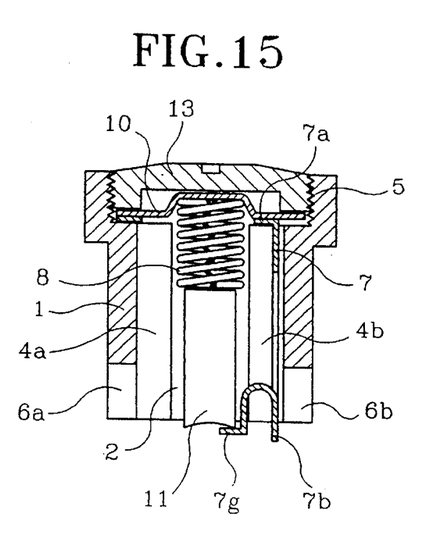
FIG. 15 is a longitudinal section view showing another preferred embodiment of the present invention in an assembled state.
Figure 16:
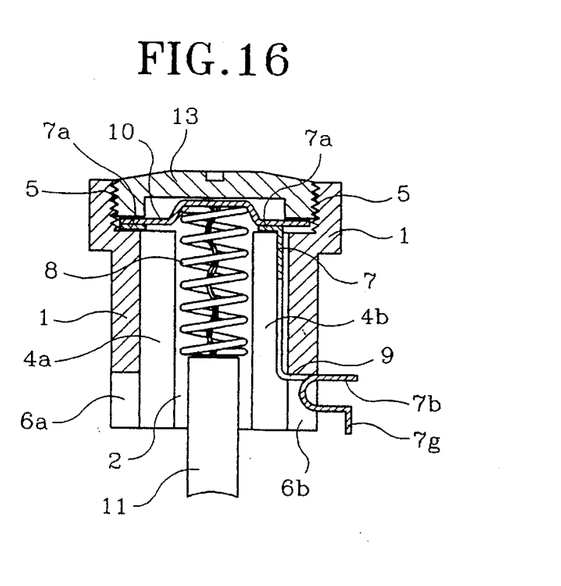
FIG. 16 is a longitudinal section view similar to FIG. 15 but showing the lead terminal in an outwardly bent state.
Figure 17:
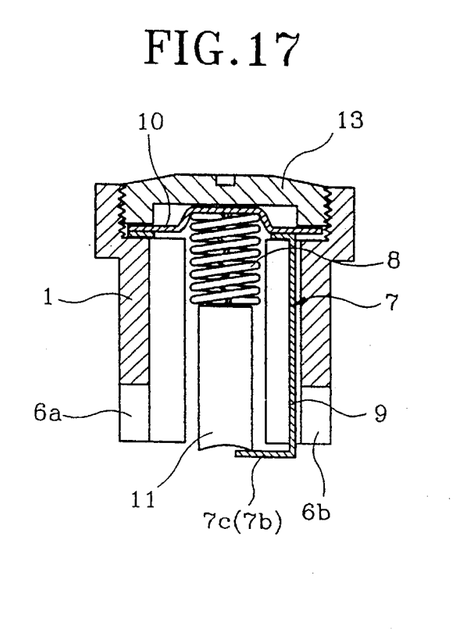
FIG. 17 is a longitudinal section view of another embodiment of FIG. 15.
Figure 18:
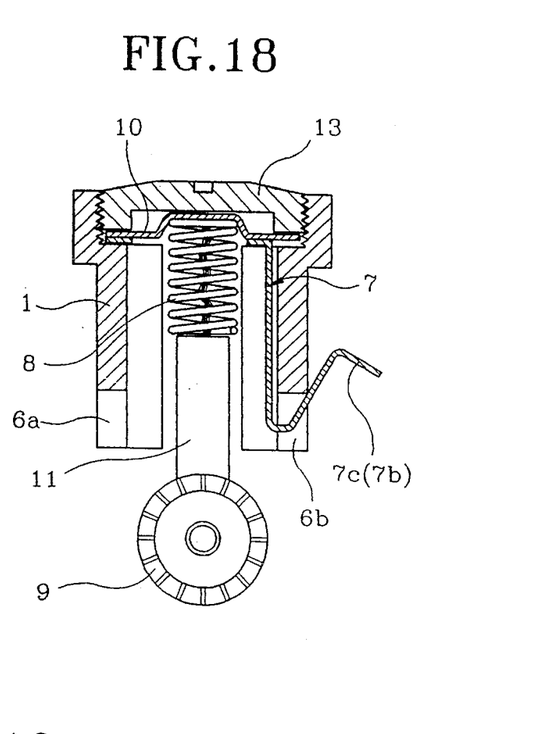
FIG. 18 is a longitudinal section view showing the lead terminal in FIG. 17 in a bent state.
Figure 19:
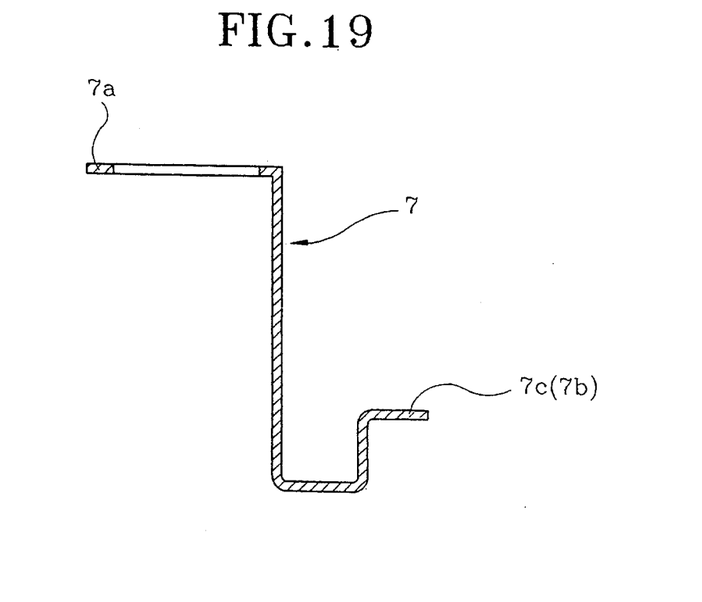
FIG. 19 is a longitidudinal section view showing the lead terminal bent by a different method.

FIGS. 15 and 16 show another preferred embodiment of the brush holder with a lead terminal formed in a different shape, wherein the lead tab 7 is provided with a locking piece 7g as well as a tab 7b at the lower end thereof. At the time of assembling the carbon brush 11, the locking piece 7g detains the carbon brush 11 as shown in FIG. 15, and thereafter is bent outwardly to release the carbon brush 11 as shown in FIG. 16. Alternatively, as shown in FIGS. 17 and 18, it is also possible to form a inwardly bent portion 7c at the end of the lower end of the tab 7b of the lead terminal 7 serving as a stopper for temporarily detaining the carbon brush and then to outwardly bend the tab portion for restoring the tab function of the tab portion after the brush holder is assembled. The lead terminal may also be shaped as shown in FIG. 19.

According to the preferred embodiments as explained above, if the lead terminal 7 is inserted through one of lead slots 4a, 4b formed in the receiving part 2 of the holder body 1, the tab 7b of the lead terminal 7 is guided along one of the lead slots 4a, 4b and the hanger portion 7a of the lead terminal 7 is seated on the mounting step 1a.

After this step, the carbon brush 11 connected to the brush terminal 10 via a flexible copper conductor 12 is inserted into the holder body 1 and is passed through the brush slots 3a, 3b with the circumferential edge of the brush terminal 10 being seated on the hanger part 7a of the lead terminal 7 laid on the mounting step 1a, thereby an electric circuit being formed. In this state, the insulating plastic cap 13 is inserted into the fitting part 5 and the assembly of the carbon brush 11 and the lead terminal 7 is completed. Finally, the connection wire to be connected to the power source is coupled to the outwardly bent lead terminal tap 7b, whereby the lower end face of the carbon brush is in face-to-face contact with the commutator 9 under the influence of elastic forces of a spring 8 as shown in FIG. 18. By this, the assembly of the brush holder is completed.

The carbon brush 11 and the holder body 1 in accordance with a preferred embodiment of the present invention as assembled in the above manner have the advantages that the lead terminal can be stably assembled, that the tab 7b of the lead terminal 7 and the connection wire 14 can be easily and firmly connected, that the connection and assembly of the tab 7b of the lead terminal 7 and the connection wire 14 can be performed even in the assembled state of the brush holder and the commutator, and that heat generated from electric current and frictional contact of the carbon brush 11 can be naturally cooled through the cooling openings formed in the brush holder body.

In addition to the above, since it is possible to extract outwardly the tab 7b of the lead terminal 7 through one of the cooling openings, it is not necessary to change the construction of the brush holder body 1 for that purpose. And, it is also possible to shut off the flow of electric current caused by optional contacts of the carbon brush 11 and the internal surface of the brush holder body during operation.

Figure 11:
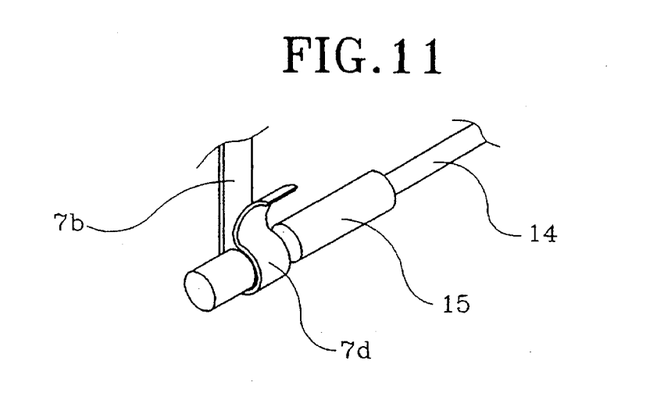
FIG. 11 is a perspective view showing the lead terminal in FIG. 10 in assembled state with the connecting wire.

Furthermore, the connection of a power source to the carbon brush 11 can be readily and conveniently performed by bending one end of the tab 7b of the lead terminal 7 to form the resilient holding portion 7d and inserting the connection rod 15 coupled to the end of the connection wire 15 to be connected to the tab 7 into the holding portion 7d as shown in FIGS. 10 and 11, or by connecting the lead terminal 7 and the connection wire using the receptacle 15a as shown in FIG. 12.

FIGS. 13 to 19 show alternative embodiments of the lead terminal 7. By forming the stopper 7f at the tab 7b of the lead terminal 7 using the slit 7e, as shown in FIGS. 13 and 14, the carbon brush 11 can be easily assembled. And, when the locking piece 7g is formed at the lower end of the tab 7b and then carbon brush 11 is inserted into the holder body 1 as shown in FIGS. 15 and 17, the carbon brush 11 can be assembled while being supported at the lower end by the locking piece 7g and then the tab 7b together with the locking piece 7g can be outwardly bent to be extracted through one of the cooling openings, to connect the tab 7b to the connection wire 14. Therefore, the assembly of brush 11 and the connection of wire 14 can be more easily performed.

Furthermore, it is also possible that the inwardly bent portion 7c is formed by bending inwardly the lower end of the lead terminal, so that the bent portion 7c can serve as a stopper supporting the carbon brush at the time assembling the carbon brush 11 as shown in FIG. 17 and then the lead terminal is bent outwardly through the cooling opening as shown in FIG. 18 after the assembly of the carbon brush is completed, so that the lead terminal 7 can function as a tab. In this case, since the bent portion 7c is outwardly projected, the connection of the bent portion with the connection wire 14 can be made more easily.

In accordance with the present invention, it is possible to reduce frictional contacts of the carbon brush 11 and the brush holder body 1 inside of the brush holder and to prohibit electric short phenomena therebetween, and thus the generation of heat can be also prohibited. Furthermore, the connection function of the connection wire 14 can be more easily performed using various shapes of lead terminals 7, and thus assembling the brush holder can also be more readily and conveniently assembled and fitted. In addition, the driving efficiency of the motor incorporating the technical idea of the present invention can be enhanced.

What is claimed is:

1. A carbon brush holder for a commutator motor comprising a receiving part for a carbon brush with a brush terminal and a lead terminal with a hanger portion and a tab, a holder body formed from an insulation material, the receiving part being formed to pass through the holder body in the longitudinal direction of the holder body, having a head portion at one end, and directly receiving the carbon brush without a brass insert, a fitting portion having threads formed at the head portion, the diameter of the fitting portion being greater than that of the cross-shaped receiving part, a cap being inserted within the fitting portion, and a mounting step formed by the difference in diameters of the receiving part and the fitting portion;

wherein two opposed lead slots extended in the longitudinal direction of the receiving part are formed in an internal surface of the receiving part, the tab of the lead terminal being inserted into one lead slot with-the hanger portion of the lead terminal being seated on the mounting step while the other slot acting as a cooling duct;

wherein two opposed brush slots extended in the longitudinal direction of the receiving part are also formed in the internal surface of the receiving part, each brush slot being placed at an intermediate position between said lead slots forming a cross-shaped section, the carbon brush being inserted between the brush slots with the brush terminal being laid on the mounting step; and wherein cooling means is formed by an opening extended from one end to middle portion of each lead slot, the cooling means allowing the tab to be bent outwardly and release heat.

2. The carbon brush holder according to claim 1, wherein the lead terminal is a rod-shaped lead terminal having a hanger portion and a terminal rod bent from the hanger portion.

3. The carbon brush holder according to claim 1, wherein the lower end of the tab of the lead terminal is bent to form a resilient holding portion, into which a connection rod of an electric connection wire is inserted.

4. The carbon brush holder according to claim 1, wherein the tab of the lead terminal is inserted into a receptacle fitted at the end of a connection wire.

5. The carbon brush holder according to claim 1, wherein a slit is formed in the tab of the lead terminal and a portion surrounded by the slit is bent to form a stopper.

6. The carbon brush holder according to claim 1, wherein a locking piece for supporting the carbon brush is formed at a lower end of the tab of the lead terminal.

7. The carbon brush holder according to claim 1, wherein an inwardly bent portion is formed at the lower end of the tab of the lead terminal to support the carbon brush at the time of assembling the brush, and after the brush holder is assembled to a motor housing, the inwardly bent portion is outwardly bent to function as a tab.

8. The carbon brush holder according to claim 2, wherein the tab of the lead terminal is inserted into a receptacle fitted at the end of a connection wire.

* * * * *